Oct. 5, 1954  D. C. TRACY  2,690,775
MEASURING DEVICE FOR ATTACHMENT TO SAW TABLES
Filed June 4, 1953
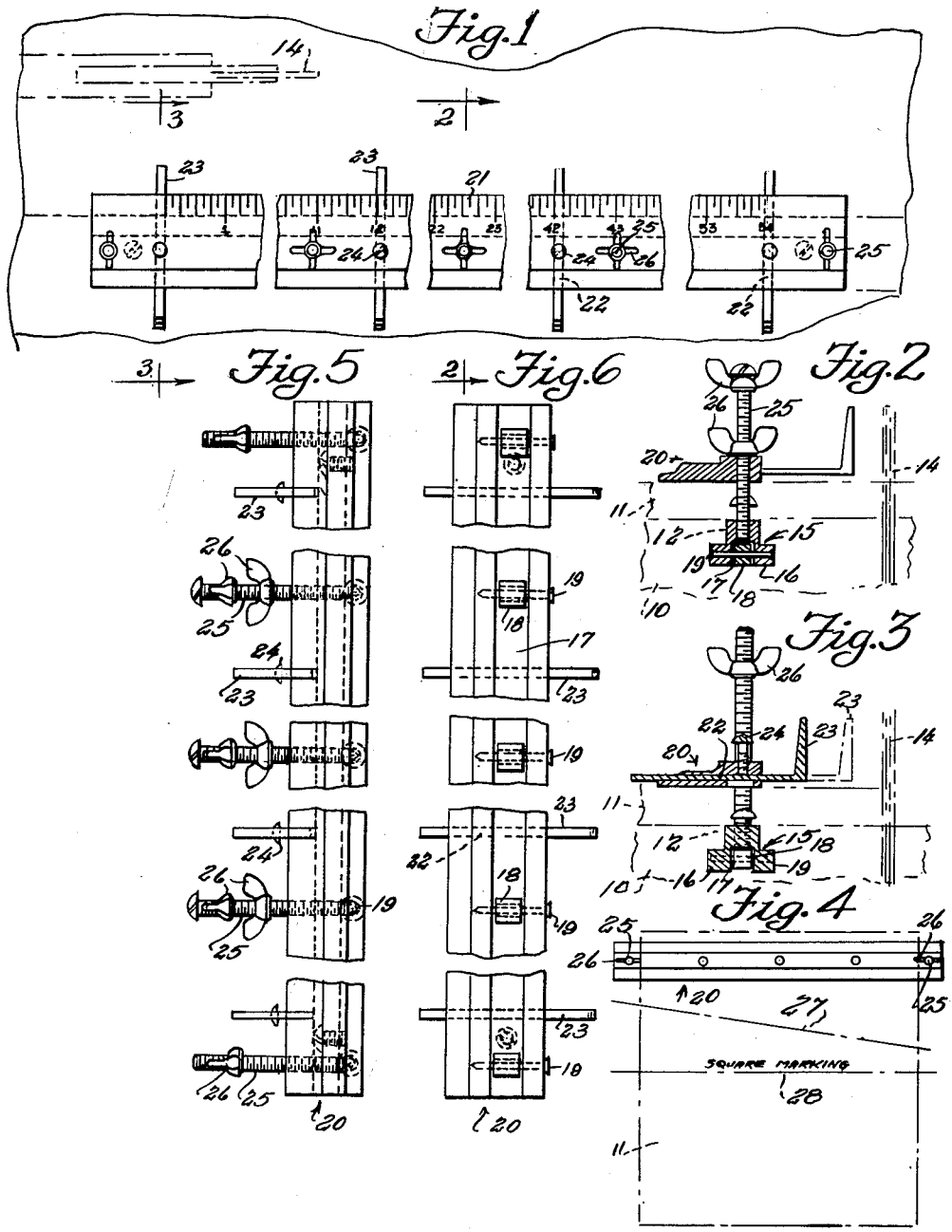
INVENTOR.
Donald C. Tracy,
BY Victor J. Evans & Co.
ATTORNEYS Patented Oct. 5, 1954

2,690,775

UNITED STATES PATENT OFFICE 2,690,775

MEASURING DEVICE FOR ATTACHMENT TO SAW TABLES

Donald C. Tracy, Lakeview, Oreg.

Application June 4, 1953, Serial No. 359,465

1 Claim. (Cl. 143—174)

This invention relates to a saw, and more particularly to a measuring device for attachment to a saw table.

The object of the invention is to provide a measuring device which can be readily attached to a saw so that various materials such as wood or veneer, can be cut with ease and accuracy.

Another object of the invention is to provide an attachment which includes a rule bar that acts as a guide to permit boards and the like to be accurately cut or sawed.

A further object of the invention is to provide a saw attachment which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a top plan view of the saw attachment, constructed according to the present invention.

Figure 2 is a sectional view taken on the line 2—2 of Figure 1.

Figure 3 is a sectional view taken on the line 3—3 of Figure 1.

Figure 4 is a plan view showing the attachment being used.

Figure 5 is a side elevational view of the saw table attachment.

Figure 6 is a bottom plan view of the attachment.

Referring in detail to the drawings, the numeral 10 designates a saw table, broken lines Figure 3, and supported on the saw table 10 is the wood or veneer 11 which is to be cut or sawed. The saw table 10 is provided with an elongated groove or cut-out 12 of T-shape for a purpose to be later described, and the numeral 14 designates any suitable saw which is adapted to be used for cutting the stock 11.

Movably mounted in the cut-out 12 in the saw table 10 is a carriage 15 which includes a body member 16. The body member 16 is provided with an elongated longitudinally extending recess or groove 17 in its lower surface, and a plurality of rollers or ball bearings 18 are rotatably supported in the groove 17 by means of pins 19. Thus the carriage 15 can be shifted or moved in the cut-out 12 due to the provision of the rollers 18.

Adjustably connected to the body member 16 is a rule or bar 20 which may be fabricated of any suitable material. The bar 20 is provided with scale markings 21 which extend along one edge thereof, and the bar 20 is further provided with a plurality of spaced parallel transversely extending slots 22. An L-shaped gauge 23 is slidably mounted in each of the slots 22, and a set screw 24 is provided for maintaining each of the gauges 23 immobile in their adjusted positions.

A means is provided for adjustably connecting the rule 20 to the carriage 15, and this means comprises threaded bolts 25 which extend upwardly from the carriage 15 through the rule 20. Wing nuts 26 may be arranged in threaded engagement with the upper ends of the bolts 25.

In Figure 4 the rule 20 is shown being used for marking lines on a board 11 so that the board can readily be cut by a saw. In this view all of the bolts have been removed except the two end bolts 25 and the board 11 is positioned or interposed between the pair of bolts 25. The rule 20 can be used for marking the angular line 27 or the square marking 28.

From the foregoing it is apparent that an attachment is provided which will hold a board in the exact position while being sawed. The rule bar 20 acts as a guide so that the board can be accurately sawed. In the present invention the board is held in place and pushed through between the saw table 10 and the rule 20 to be cut. Gauges 23 are constructed so that the saw 14 is in direct alignment with the ends of the gauges so that by putting a board that has been squared or angled between the carriage 15 and the bar rule 20, the gauges 23 can be set out or pushed out and sat on the mark for sawing and when the board is to be sawed the gauges can be pulled back. The gauges 23 may be made of any suitable material such as plastic, aluminum, or fiber. The screws 24 serve to maintain the gauges 23 immobile in their various adjusted positions. The markings 21 on the rule 20 enable the operator to ascertain the width or length of the board that is being cut or ripped. Any number of gauges 23 can be used as desired. The rollers 18 insure that the carriage 15 will travel smoothly in the groove 12 in the table 10. The two end bolts 25 do not have to be removed when a board is to be inserted between the rule and carriage, since the board can be merely shoved into place between these two members after the intermediate bolts have been removed. Any type of material can be handled with the present attachment such as wallboard, plaster board and the like and the groove 12 in the table can be in any desired position in the table. The present invention will enable the operator to accurately cut various types of material. Thus, the user will be able to square or cut a board at any angle regardless of its size or thickness. The board to be squared or cut on an angle is placed on the slide carriage 15, the board being indicated by the numeral 11 and then the rule 20 is placed on top of the board 11 and fastened to the carriage by the bolts 25. The wing nuts 26 can be tightened to maintain the parts immobile in their adjusted positions.

I claim:

An attachment for a saw comprising a carriage slidably mounted in a cut-out in a saw table and including a body member provided with an elongated recess in its lower surface, a plurality of rollers rotatably mounted in said recess for slidably supporting said carriage, a bar adjustably mounted above said carriage and having indicia thereon, securing elements connecting said bar to said carriage, there being a plurality of spaced parallel slots extending transversely through said bar, an L-shaped gauge slidably mounted in each of said slots, and securing elements extending through said bar and into engagement with said gauges.

References Cited in the file of this patent

UNITED STATES PATENTS

| Number | Name | Date |
| --- | --- | --- |
| 594,985 | Dalbey | Dec. 7, 1897 |
| 637,214 | Pangborn | Nov. 14, 1899 |
| 785,699 | Bemis | Mar. 21, 1905 |
| 1,789,125 | Wilderson | Jan. 13, 1931 |
| 1,831,124 | Koster | Nov. 10, 1931 |
| 1,923,853 | Van Guyn | Aug. 22, 1933 |